INVENTOR.
Alfred Curci

April 19, 1966 A. CURCI 3,246,861
CONVERTIBLE AIRCRAFT
Filed March 30, 1964 2 Sheets-Sheet 2
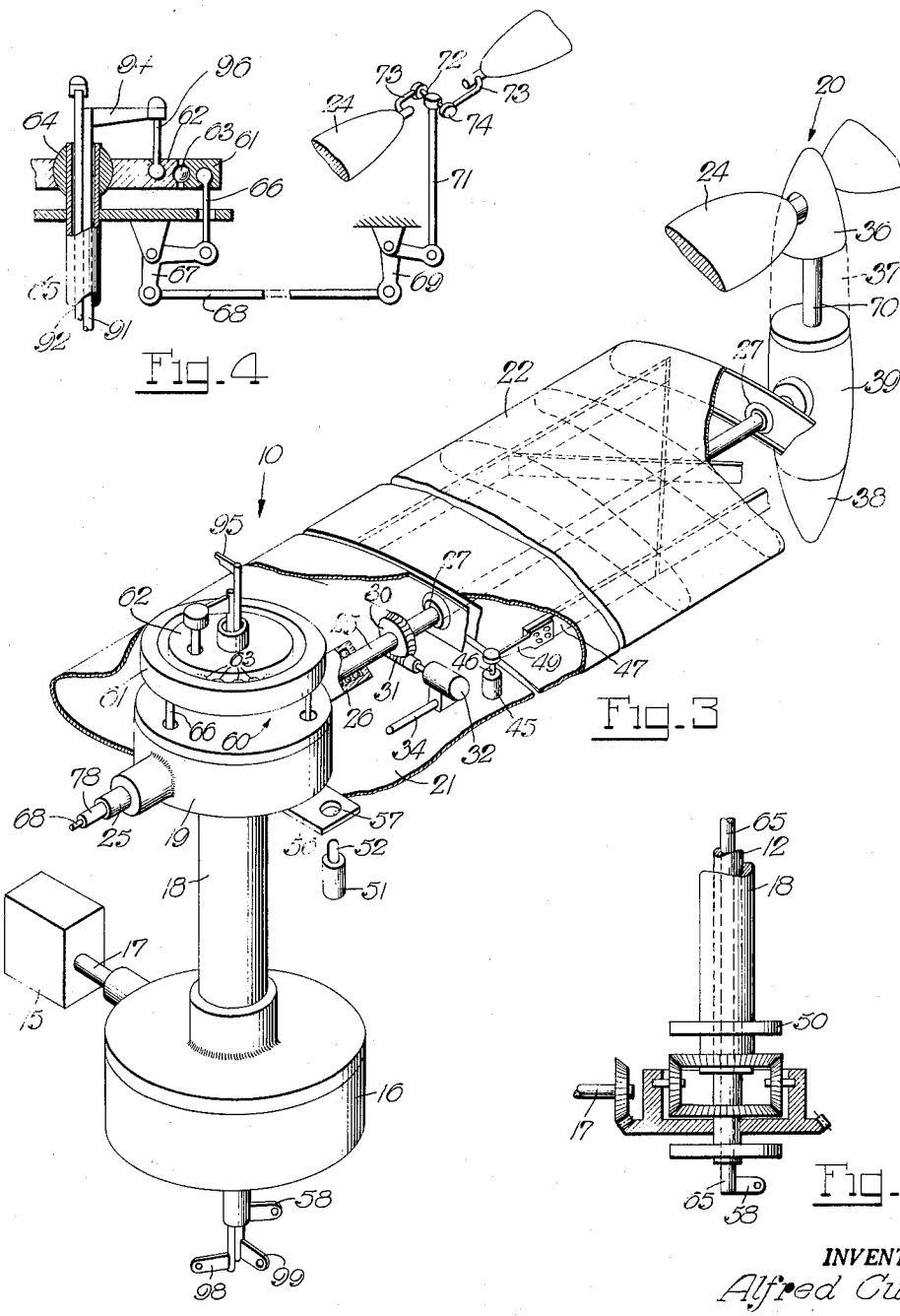
INVENTOR.
Alfred Curci

3,246,861
CONVERTIBLE AIRCRAFT
Alfred Curci, 183 London Drive, Hamden, Conn.
Filed Mar. 30, 1964, Ser. No. 355,570
4 Claims. (Cl. 244—7)

This invention relates to aircraft and more particularly to a compound convertible, or all-purpose rotary wing aircraft which overcomes the disadvantages hereinafter detailed. In its broad aspect, the invention provides, in combination with an aircraft, a novel arrangement of a plurality of lifting-propulsive rotors, which optionally may be transitioned into three basic flight configurations, thereby providing relatively optimum conditions for the various flight regimes of the aircraft, namely:

(1) Converted to "take-off" helicopter configuration, relatively optimum rotor conditions are provided for vertical take off and landing, hovering and slow forward flight.

(2) Converted to "compound helicopter" configuration, relatively optimum rotor conditions are provided to avoid both blade stall and compressibility conditions of a rotor in forward flight, thus enabling the aircraft to achieve a much larger translational speed in comparison with maximum forward speeds obtainable by presently known helicopters.

(3) Converted to "airplane" configuration optimum lift/drag conditions are provided, whereby the forward velocity of the aircraft is limited only by those limitations that now apply to any conventional airplane.

The perplexing problem of limited forward speed of the helicopter has been studied by every type of aeronautical organization in search of a practical solution to the problem that would enable the rotary wing aircraft to increase its forward speed so as to operate at a value of economy comparable to the airplane. Although the factors limiting the forward speed of a helicopter are clearly known and understood in the art, the operational characteristics of all rotary wings in forward flight poses problems that have aeronautical engineers puzzled since there appears to be no definite solution to the problems, thus the speed question remains a challenging one in the art.

Failing to find a suitable means to increase the severely limited forward speed of the helicopter, aeronautical engineers and inventors instead have endeavored to successfully combine the desirable vertical lift qualities of the helicopter with the high-speed economy of the airplane, and thus, an experimental aircraft, known as "convertiplane" or "VTOL" (vertical take off and landing) was born, and includes, among others, such configurations as the tilt-wing, deflected slipstream, ducted fan, and tilt-rotor aircraft. Limited flight-test results of these experimental VTOL aircrafts, although indicating that they are capable of relatively higher translatory speeds (too often achieved at the prohibitively high cost of excessive installed power) have otherwise proven to be generally unsatisfactory. They have failed completely in their design objective (which is perhaps of greater importance than increased cruise speed) to retain the desirable hovering and vetrical take off and landing performance of the helicopter, vertical lift efficiency has been either compromised or ignored. One major reason, among others, that these prior experimental VTOL aircraft have generally proven operationally unacceptable, has stemmed directly from the results of having traded-off vertical lift efficiency for increased cruise speed, in case of engine failure, these prior machines being poorly equipped to insure safe landings by self-sustaining or autorotational means require 100% engine reliability for safety. Trading safety for increased forward speed is an intolerable drawback of these prior VTOL aircrafts.

Now turning to the reasons that severely limit the forward speed of all helicopters, it is well known, that unlike the fixed-wing of the conventional airplane, wherein lift increases with increased forward speed, conversely, all helicopter rotors, due to changing aerodynamic conditions of the rotor blades in their cycle of rotation, at certain critical forward speeds, experience instead, rapid deterioration of lifting efficiency, accompanied by violent destructive vibrations, and rotor power requirements incerase prohibitively. The aerodynamic pecularities of a helicopter rotor in flight effect an unbalanced lift force across the rotor, within the designed speed of the helicopter rotor, the non-uniform lift force of the rotor is balanced or controlled by differentially varying the angle of attack on the advancing and retreating halves of the rotor. However, as the forward speed of the helicopter rotor increases to a known critical point, each blade-tip on the advancing side of the rotor approaches Mach 1 speed and enconuters the serious disadvantages associated with any wing flying at such speeds. Each blade on the retreating half of the rotor in turn encounters air moving at such relatively slow speeds that blade stall occurs; this condition of the rotor blades imposes a definite limit on the maximum speed obtainable by all pure helicopters. In order to increase the forward speed of the pure helicopter, both blade stall and compressibility must be postponed or avoided, but so far as is known, no means exist to accomplish this.

Another significant disadvantage common to all rotary wing aircraft that stems from the flight variables that confront all such craft, is that design engineers are compelled to compromise between the conflicting optimum design requirement of vertical flight performance and the optimum design requirements of maximum flying speed. Heretofore, compromise has been necessary in both the choice of rotor size and rotor blade-tip speed.

It has been found in practice, that a large, lightly loaded helicopter rotor, relative to available power, provides optimum rotor conditions for take-off, landing, and hovering performance, in addition, requiring far less hovering engine power. However, choice of such a large rotor is most undesirable for high speed forward flight of the helicopter resulting in the poorest lift/drag ratio, excessive power is required to overcome rotor drag to enable the helicopter to obtain normal cruise speed.

On the other hand, a small, highly loaded helicopter rotor, which provides relatively optimum conditions for cruise flight, is an unrealistic choice for take-off, landing and hovering performance. Choice of a small rotor, not only requires prohibitive hovering power, but for obvious reasons has to be operated at excessively high rotational speed in order to generate adequate lifting efficiency for taking off and landing vertically, and would result in a dangerously high rotor downwash velocity, endangering the aircraft, its occupants, as well as nearby personnel when operated over loose or unprepared terrain.

Flight variables of the helicopter rotor also compel design engineers of present day rotorcraft to compromise between the conflicting requirements of optimum blade-tip speeds of the rotor for the different flight regimes. Choice of the optimum blade tip speed for vertical take off and landing is an unfavorable choice for cruise flight wherein tip-speed of each blade as it rotates forwardly and flight speed of the aircraft are additive, the result being, as forward velocity of the helicopter increases to a critical point, the tip of each blade as it advances approaches Mach 1 speed (the speed of sound) and encounters the problems associated with Mach 1 speed. To avoid this condition designers are forced to decrease the rotor design rotational speed so that increasing cruising speed of the aircraft avoids exceeding the critical Mach number on the advancing blade tip where the two speeds are additive. However, designers must be equally careful to avoid reducing rotor speeds too drastically in order to prevent a premature stall of the blade rotating aft on the retreating half of the rotor.

Many proposals have been made to overcome the disadvantages just outlined. For instance:

Helicopter research engineers suggest that a flap or high-lift device fitted to the blade's trailing edge would increase the lift in vertical flight permitting a reduction in the length of the blades effecting lower blade tip speeds which in turn would permit a higher forward speed.

Another proposal, that is aerodynamically sound, is a telescoping arrangement for the blades to enable a variation of the effective length of the blades for different flight regimes, to thereby vary both disc area and consequently blade tip speed. However, since all blades of operational machines are slender flexible structures, both foregoing suggested solutions pose many structural and engineering difficulties, and so far as known, none has been embodied in any operational machine.

Another means suggested to increase helicopter speed is to incorporate change speed gears, shiftable in flight to vary rotor speed. However, serious drawbacks, both mechanical and operational, render gear shifting in flight unattractive, since the time factor involved to shift gears in flight may effect a serious loss of altitude endangering the craft.

Other means to increase speed which has been incorporated in some operational helicopters, such as, an induced lead-lag motion of the blades, or by introducing a second or higher periodic pitch change of the blades in combination with the usual feathering have been of little value in view of the small increase realized in horizontal velocity.

Despite the extensive research and numerous attempts that have been made to increase helicopter cruise speed, no success has been achieved. The rotary wing craft remains inefficiently slow in comparison with a fixed wing aircraft of comparable size and power.

The present invention provides means to solve the above detailed problems. One phase of the invention comprises means to vary within considerably wide values, both the effective rotor disc area and rotor blade tip speed, thereby providing optimum conditions for the various flight regimes, enabling an aircraft embodying the invention to increase cruise speed by avoiding rotor operational limitations that heretofore has affected all rotary wing aircraft severely limiting their forward speed.

Experts in the art concede that at speeds beyond 250 m.p.h. use of a rotating wing in any form is impractical, requiring prohibitive power to overcome rotor drag, so in view of this concept, another phase of the invention includes means in combination to convert the aircraft from helicopter configuration to a relatively low drag fixed wing airplane.

Briefly described, the invention comprises (in this case as shown in the drawings) three airfoil or wing systems appropriately adapted for power driven operation. A first wing system, optionally operable either as a rotary wing or airplane fixed wing is appropriately mounted on a suitable fuselage in a vertically spaced relation thereto for rotation in a generally horizontal plane. Twin rotors or wing systems, which are optionally operable as helicopter rotors or conventional airplane propellers, are carried by and are suitably tiltably mounted on the first wing system, preferably at the tips thereof, for rotation therewith, in a vertically spaced relation thereto for rotation in a generally horizontal plane when operating as helicopter rotors or in a generally vertical plane when operating as airplane propellers. The arrangement is such that the three wing systems are individually turnable about their respective rotary axes relative to one another and are also capable of conjoint rotation about the central axis journalled in the fuselage.

Conjoint rotation of the three wing systems which will be referred to hereinafter as "take off" configuration, provides relatively the largest rotor diameter, since the diameter of the circle swept by the blade tips of the outboard rotors during conjoint rotation with the first wing system, comprises the span of the said first wing system and includes the radii of the twin outboard rotors. Thus, in take off configuration, relatively the largest lightly loaded disc area is provided, which as known, is the optimum condition, with respect to any given weight and power, for vertical lift efficiency.

When the aircraft of the invention is airborne, another phase of the invention comprises known means in combination, to convert the aircraft from take-off configuration to compound helicopter configuration, and includes known means to rapidly slow down, stop, and rigidly locking the first wing in normal fixed-wing position relative to the fuselage, with the outboard rotors operating in normal helicopter condition at the opposite tips of said rigidly fixed first wing.

By transition to the above condition, which will be referred to hereinafter as a "compound helicopter," both effective disc area and blade tip speeds are reduced by a wide margin with respect to those values in take-off configuration, providing relatively optimum rotor conditions, enabling the aircraft to achieve a much larger horizontal speed than prior helicopters.

Helicopter rotor drag increases enormously with large forward velocity rendering the use of a rotary wing of any form impractical at speeds above 250 m.p.h., at such relatively high speed prohibitive power is required to overcome rotor drag. Therefore, another phase of the invention, comprises known means in combination, to convert the aircraft of the invention from compound helicopter configuration to airplane configuration, and includes means to bodily swivel the outboard rotors 90 degrees to and from alternate positions with the respective axes thereof either generally vertical or generally horizontal. Operating as a relatively small fixed wing airplane of low drag configuration, the aircraft of the invention is capable of large forward speed limited only by those limitations that apply to any conventional airplane.

The present invention consists basically of new combinations of known elements, the construction and operation thereof being well understood in the art. Each of these elements may assume varied constructional form in keeping with good practice and suitable for application to the present invention. Since the invention relates basically to the novel combinations, and not to the construction of any element thereof per se, the drawings have been more or less diagrammatically presented. In the drawings:

FIG. 3 is a perspective diagram, with parts broken away, showing in part the general arrangement of the rotor wing systems.

FIG. 4 is a diagram of the swashplate in section, together with a schematic arrangement of the associated control elements shown in part.

FIG. 5 is a diagram showing one arrangement of the internal gears and cooperating elements of the lower gear box.

To more clearly explain the broad objects of this invention, it will be first described by means of a hypothetical aircraft constructed according to this invention, certain structural features will be omitted to simplify the explanation. Dimensions, and other factors ascribed to the hypothetical craft are to be considered for descriptive reasons only and are not intended to represent those values that actually may be used to reduce the invention to practice.

Figure 1:
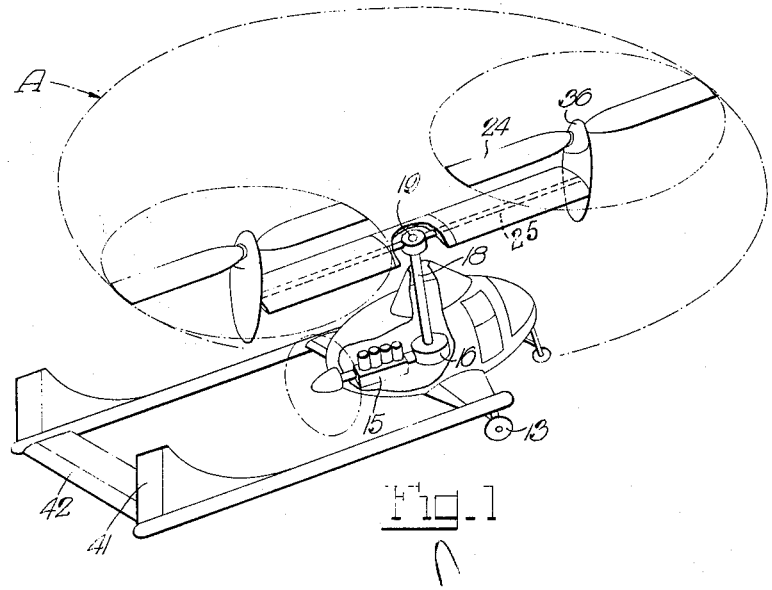
FIG. 1 is a perspective view of an aircraft according to the invention as it may appear during take-off, landing, hovering, or slow vertical flight, that is, with the plurality of wing systems rotating conjointly, a pusher propeller is also included.
Figure 2:
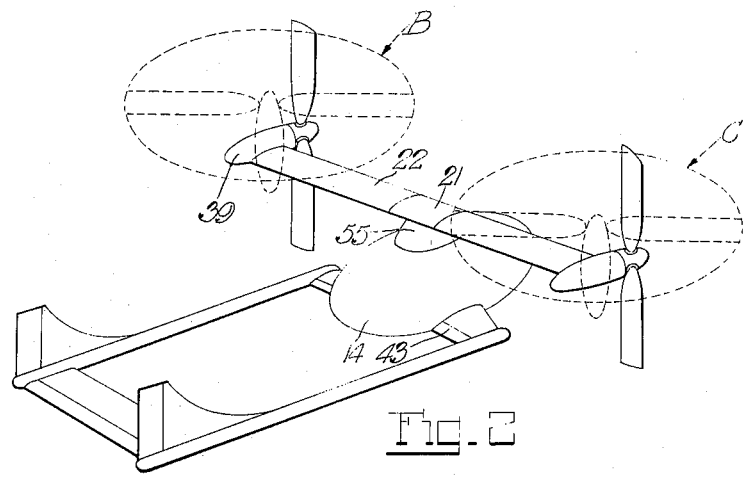
FIG. 2 is a view somewhat similar to FIG. 1, showing the aircraft as it may appear with the first wing system in fixed wing system in fixed wing airplane position, the twin outboard being shown as helicopter rotors (broken lines) and as airplane propellers (full lines). The pusher propeller of FIG. 1 is omitted.

Referring now to FIGS. 1, 2 and 3, a first wing system, broadly designated 10, is rotatively supported above fuselage 14 and may be power driven by any suitable means such as engine 15 including any known clutch and free wheeling device permitting the wing systems to autorotate in a manner common to rotary wing aircraft. If desired wing 10 may be power rotated by reaction devices comprising any suitable well known jet system (not shown) located as normal at the tips of wing 10.

The first wing system 10 will be assumed to have a span of 22 ft., a mean chord of 1.5 ft. providing an effective wing surface of 33 sq. ft. Since it will be assumed that the craft is based on a design gross weight of 2,000 lb. during fixed wing airplane mode of operation, wing loading will be approximately 60 lb. a sq. ft. providing relatively maximum value of the lift/drag ratio.

Appropriately carried at the opposite lateral extremities of wing 10 are twin outboard rotors, broadly designated 20, being suitably arranged for optional operation as helicopter rotors or as airplane propellers, as will be described subsequently.

Although preferable that the outboard rotors 20 rotate during all flight regimes, it should be noted here and will be so considered for the present, that if desired, when the aircraft of the invention operates in take-off configuration the twin outboard rotors 20 may be carried at the opposite tips of the first wing system 10 in an immobilized condition, oriented and locked with the respective longitudinal axes of said twin rotors in vertically spaced longitudinal alignment with the spanwise axis of wing 10, as such, the radius of each of the outboard rotors 20 becomes, in effect integral lateral extension of wing 10. Assuming that each outboard rotor has a diameter of 10 ft., adding the radii thereof to the span of wing 10, which was assumed to be 22 ft., provides a rotor diameter of 32 ft., comprising a disc area of approximately 800 sq. ft., represented by the area enclosed within the periphery of the circle shown in broken lines at A in FIG. 1. Recalling that the craft has a gross weight of 2,000 lb. which when divided by the 800 sq. ft. disc area results in a disc loading of 2.5 lb. a sq. ft.

The dimension of the outboard rotor gear boxes 39 was intentionally disregarded, the inclusion thereof would result in a rotor diameter somewhat larger than 32 ft.

In such cases as mentioned above, when the outboard rotors 20 are carried immobilized at the tips of wing 10, any suitable mechanism may be included to releasably lock the rotors in fixed position, and may conveniently comprise similar means to that used for locking wing 10 in a fixed-wing airplane position which will be described later. It should be noted also, that although the outboard rotors 20 are shown to have two blades, a single counter-weighted blade may be substituted.

As previously pointed out, experience teaches that a relatively large, lightly loaded rotor provides optimum conditions, with respect to available power, for vertical ascent and descent, hovering, and slow forward flight. This is confirmed in present practice, wherein it is found that all operational helicopters having good lifting and hovering performance, with respect to normal installed power, have a low rotor disc loading ranging between 2 and 3 lb. a sq. ft. Accordingly, the aircraft of the present invention, when operating in take off configuration, by reason of the novel arrangement of the conjointly operable plurality of rotor-wing systems, a low disc loading 2.5 lb. a sq. ft. is provided for optimum vertical take off flight performance.

When the aircraft of the invention is airborne and in forward flight, known means controlled by the operator, to be detailed later, is provided to convert the aircraft from take off configuration to compound helicopter configuration, which is best seen in FIG. 2, the helicopter position of the rotors being shown in broken lines. Suitable means is included to rapidly slow down, stopping, releasably locking wing 10 in fixed-wing position relative to the fuselage 14, simultaneously, with the introduction of the above action, the twin outboard rotors 20 are released from the locked position, power means quickly impart effective rotational speed to said rotors 20, enabling them to perform as normal helicopter rotors being bodily fixed at the lateral extremities of the fixed wing 10.

When operating in compound helicopter position, the 10 ft. outboard rotors together provide a sustaining disc area of 157 sq. ft. which is considerably less than the 800 sq. ft. sustaining area provided during take off; disc loading is correspondingly increased from 2.5 lb. a sq. ft. in take off configuration to 12.7 lb. a sq. ft. in compound helicopter configuration. As a further important effect of transition to compound helicopter configuration, automatically rotor tip speed is reduced by a very wide margin relative to rotor tip speed at take off.

As before stated, heretofore, all operational helicopters have been designed by compromise with respect to choice of rotor r.p.m. It is a fact recognized in the art, that for performance efficiency, it is necessary to keep rotor tip speed at high translational speed less than at take off, the reason being to keep the blade tip speed below the speed of sound as forward speed increases. Actual speed of the rotor in forward flight of the aircraft is a resultant of the rotational speed and translational speed.

In the aircraft of the present invention, any optimum rotor speed below the speed of sound may be used, completely disregarding translational speed. For example, let it be assumed that the chosen rotor speed at take off is 400 r.p.m., as such, blade tip-speed during take-off is approximately 40,000 f.p.m., the result of multiplying 400 by the circumference of the 32 ft. diameter rotor disc, indicated at A in FIG. 1. When the aircraft is transitioned to operate in compound helicopter configuration, blade tip-speed automatically is decreased to a value of the periphery of the disc area swept by the blades of the outboard rotors 20, indicated by broken lines at B and C in FIG. 2, which on the basis that both gear ratio and r.p.m. remains unchanged from those values at take off, blade tip-speed of the outboard rotors 20 is decreased to 12,560 f.p.m. effecting a wide reduction as compared with blade tip-speed of 40,000 f.p.m. during take off.

From the foregoing description, it will be evident, that when the aircraft of the invention is transitioned to operate as a compound helicopter, a wide reduction is effected both in rotor size and consequently blade tip speed. Thus, optimum rotor conditions are provided to overcome rotor operational limitations that heretofore have severely limited forward speed of prior helicopters, namely, both blade stall and conflicting blade-tip speeds are avoided, additionally, due to the use of relatively small, highly loaded helicopter rotors, the aerodynamic drag of the rotor is reduced to a minimum. Further, during slow forward speed flight of the aircraft, provision of a relatively small, highly loaded fixed-wing 10 of low drag configuration, serves, at first, to augment the lift force of the outboard rotors 20, and with acceleration of forward speed, the fixed wing 10 progressively develops lift force to sustain the entire weight of the aircraft, thereby completely relieving the outboard rotors 20 from lifting duty. Thus, the outboard rotors function more efficiently, with the maximum power thereof being diverted to propulsive thrust means, enabling the aircraft to achieve much larger horizontal velocity than prior helicopters of comparable size and weight.

Flight speed of a "pure" helicopter above 250 m.p.h. is thoroughly impractical even if the aerodynamic limits of a rotor in flight are avoided, rotor power requirement at this speed is prohibitive. It is for this reason, another phase of the aircraft of the invention comprises means in combination, to convert the aircraft from compound helicopter configuration to airplane configuration, and, in a manner to be described later, the outboard rotors 20 may be arranged to rotate or swivel 90 degrees to and from positions in which the rotors are operable either as helicopter rotors, rotating in a generally horizontal plane, shown by broken lines in FIG. 2, or as airplane propellers rotating in a generally vertical plane, shown by full lines, FIG. 2.

Several objectionable characteristics of prior VTOL aircrafts, none of which are operationally acceptable, are overcome by the present invention, for example, the fixed wing of prior convertibles is capable of generating lift force only at a large forward velocity, in the critical take off stage, at slow or zero forward speed, when vertical lift efficiency is most vitally required, the fixed wing provides absolutely no vertical lift force, in fact, in such cases wherein the tilt-rotor principle is used, the fixed wing of these prior aircraft adversely affects vertical lift, being as it is, projected within the downwash velocity of the rotor which impinges on the surface of the fixed wing severely impairing the lifting efficiency of the rotor. Obviously, this disadvantage is avoided in the aircraft of the present invention because wing 10, which may be optionally operable as a lifting rotor or as a fixed wing, does itself function as a rotor during take off and landing, thereby providing vertical lift force even at zero forward speed of the aircraft.

A further disadvantage of prior tilt-rotor aircraft is that the rotors, which are used without change in size for both take off and high speed forward flight, are therefore much larger than necessary to sustain the craft during high speed forward flight. Although these prior rotors have been tailored for increased cruise speed, with the result that take-off and landing, and hovering performance has been neglected or ignored, nevertheless, these prior rotors, in order to have reasonable but poor lifting force for taking off and landing, cannot be reduced beyond certain critical values, and as such, necessarily, are substantially larger as compared with the novelly arranged rotors that may be employed in an aircraft of this invention of comparable weight and installed power.

These relatively large rotors of prior tilt-rotor aircrafts, similar to helicopter rotors, are lightly constructed to avoid a serious weight penalty, and in order to prevent rotor damage by operational strains, especially the large stresses that occur at the root of these large blades, it is essential that a helicopter type of articulation is incorporated in the rotor design. Although blade flapping in a rotor is desirable during the helicopter mode of flight, both for control purposes and to relieve unbalanced aerodynamic forces across the rotor disc, blade flapping is extremely unfavorable for the airplane mode of flight when the rotors are converted to propellers, however, blade flapping cannot be locked-out since it continues to function to relieve blade stresses.

It has been found in practice that large diameter flapping blade helicopter rotors do not make practical airplane propellers, one reason being that peripheral speeds thereof must be considerably decreased by substantially reducing the r.p.m. in order to more efficiently handle the increased air-mass that flows through a propeller in forward flight. Heretofore, to reduce r.p.m. of these prior large rotors when converted to propellers, the practice has been to employ different gear ratios shiftable in flight. However, gear shifting in flight has proven to be both dangerous and complex.

Flight test results of experimental tilt-rotor aircraft in airplane mode of flight, confirmed that especially in the low r.p.m. operating range required by these prior relatively large flapping blade rotors, excessive blade flapping occurs in all angular movements of the aircraft, accompanied by intolerable, destructive airframe vibrations that severely limit even mild airplane maneuvers.

In an aircraft of the present invention, the above described disadvantages of prior machines are overcome by the novel arrangement and mode of operation of the plurality of wing systems, configured to provide optimum rotor conditions for both take off and landing and high speed forward flight. During high-speed helicopter flight, both disc size and consequently blade tip speed of the sustaining rotors are reduced relatively by a wide margin, so that when the helicopter rotors are converted to propellers no gear shifting means is required to reduce r.p.m.

The propellers 20, of the present invention being considerably smaller than prior similarly used propellers in aircraft of comparable size and power, results in a large savings of structural weight which may be advantageously used to design the propellers 20 similar to the structure of a modern high-speed propeller, thus, the roots of blades may be designed structurally superior in strength to withstand all operational stresses, similar to airplane propellers, inherent physical strength of the blades may be relied upon to avoid any tendency of the blades to vibrate or flutter. The need for rotor blade flapping, although it may be retained, desirably, in the helicopter mode of flight, may be completely eliminated or locked out during airplane mode of operation. Thus, by deactivating rotor blade flapping when the rotors are used as propellers, the inability of prior tilt-rotor convertibles to perform normal airplane maneuvers is avoided in an aircraft of the present invention.

Included in the propeller system may be any known automatic blade pitch varying means, or constant speed mechanism, which may be rendered operable simultaneously with deactivation of the blade flapping means. The means to lock out blade flapping may comprise any suitable known mechanism. No effort has been made to show the means to lock out blade flapping while simultaneously rendering operable a suitable known propeller automatic pitch varying mechanism, since it is felt that it is easily accomplished by various well known means, for example, mechanically, it requires only that one end of a suitable linkage means be appropriately pivotally connected to both the blade flapping lock means and the pitch varying mechanism, the opposite end of the linkage may be suitably pivotally connected to any appropriate point on the relatively fixed wing 10, when the outboard rotors 20 are bodily swivelled forwardly 90 degrees for conversion from helicopter to airplane mode of operation, the interconnected linkage remaining stationary automatically serves to progressively lock out blade flapping while simultaneously the propeller automatic pitch varying mechanism may be rendered operable. During reconversion to airplane mode of operation, the linkage serves to automatically restore the rotor blades to their former condition of operation, i.e., blade flapping is reduced, and the automatic pitch varying means is again deactivated.

Now referring to the drawings, the aircraft of the invention as shown, comprises a suitable fuselage 14 and includes any appropriate landing gear such as indicated at 13. Rigidly secured within the fuselage 14 is gearbox 16, a drive shaft 17 extends aft therefrom being appropriately connected to and power driven by any suitable power plant, such as the internal combustion engine diagrammatically shown at 15 and may include any known clutch or free wheel device. Extending generally vertically upwardly from gear-box 16 is tubular drive shaft 18, rigidly secured to the upper end thereof for rotation therewith, is hub 19 which in turn is rigidly secured by suitable means to the center section 21 of the rotor or wing system broadly designated 10. Although preferable, for reasons that will appear later, that hub 19 be rigidly secured to drive shaft 18, if desired, a universal mounting of any known construction may be substituted.

Wing-rotor system 10, which is optionally operable as a rotor or fixed wing, comprises the center section 21 which is fixedly secured to said hub 19, and includes oppositely laterally extending variable pitch airfoil or wing halves 22 the structure thereof, of course, is broadly immaterial, but as illustrated in FIG. 3 (only one being shown) wing 22 is a conventional two spar construction having diagonal truss spars to provide structural rigidity.

Oppositely laterally extending tubular spars 25 are rotatably supported in hub 19 on suitable anti-friction bearings 26, in turn, wing halves 22 are rotatably mounted on spars 25 by means of suitable bearings 27, whereby wing halves 22 may be rocked about their respective longitudinal axes within preselected values to vary their pitch settings, as will be described subsequently. The outer ends of spars 25 extend through wing halves 22, and have rigidly secured thereto, for rotation therewith, twin outboard rotors broadly designated 20, the arrangement is such that a prescribed rotation of spars 25 bodily rotates the rigidly attached rotors 20 to and from positions in which said rotors 20 may optionally function as helicopter rotors or airplane propellers.

Preferably, the means to swivel the rotors 20, alternately between helicopter and airplane mode of operation comprises worm-wheels 30 rigidly secured on the inboard end of spars 25, said worm-wheels are adapted to mesh with cooperating worms 31 which are fixedly secured on output shafts 33 of a pair of suitable hydraulic or electric motors 32 (only one of each of the above parts is shown in FIG. 3). Motors 32 are energized by a suitable power source, an appropriate pilot actuated control element is provided (not shown) whereby motors 32 may be energized to selectively rotate spars 25 and outboard rotors 20 rigidly attached thereto, generally 90 degrees between positions in which the outboard rotors 20 operate in a generally horizontal plane of rotation or in a generally vertical plane of rotation. Motors 32, only one is shown in FIG. 3, are suitably interconnected by shaft 34 both for synchronous movement of the rotors 20 and to provide a safety feature enabling one motor 32 to complete the conversion cycle should the other motor be faulty.

Wing 10, which is operable either as a rotor or as a fixed wing, comprises fixed center section 21 and includes oppositely laterally extending adjustable pitch wing halves 22, means is provided to vary or adjust the pitch of each wing half 22 within any pre-selected value to correspond to the proper pitch requirement of wing 10 for either mode of operation. The pitch varying means for wing halves 22 comprises a pair of actuators 45 (only one is seen in FIG. 3). Said actuator 45 may be any suitable device, electrically or hydraulically operated, capable of imparting axial movement to rod 46 which extends therefrom. As shown in FIG. 3, the upper end of rod 46 is connected by ball joint means to one end of arm 49, the opposite end thereof is rigidly secured by bolting or riveting to wing spar 47, while the lower end of actuator 45 may be suitably pivotally connected to an appropriate point within center section 21. Actuator 45 may be energized by a suitable power source controlled either by pilot actuated means, automatic means, or both (not shown) whereby rod 46 may be selectively extended or retracted to rock wing halves 22, which are journalled on tubular spars 25, about their respective longitudinal axes to vary or adjust the pitch angle of wing halves 22 to a suitable predetermined value.

The mechanism provided to stop the rotation of wing 10, releasably locking it in fixed wing position transversely of the longitudinal axis fo fuselage 14, is shown diagrammatically in FIGS. 3 and 5, and comprises a brake 50, of any suitable, desired construction, on shaft 18. Application of brake 50, by suitable pilot control means (not shown) will slow down and stop rotation of wing 10 which, as described hereinbefore, is rigidly supported for rotation on drive shaft 18. Releasable lock means for wing 10, comprises actuator device 51 which includes rod or bolt 52 extending vertically therefrom. Actuator 51 may be any device, electrically or hydraulically operated, capable of imparting axial movement to bolt 52, and is rigidly secured to a fixed part of the fuselage 14 within streamline fairing 55, at a point above the said fuselage immediately below hub 19. Rigidly secured to the underside of hub 19 is radially extending lug 56 which is provided with hole 57, the arrangement being, when rotation of wing 10 is arrested by application of brake 50, actuator 51, having a suitable source of power, may be energized by appropriate pilot operated control means (not shown) to vertically extend the bolt 52, as the upper end thereof falls into alignment with cooperating hole 57, bolt 52 passes through hole 57 thereby securely releasably locking wing 10 in fixed-wing flight position relative to the fuselage. To avoid large strains on the aircraft, locking bolt 52 may be spring loaded, or actuator 51 may be made responsive to r.p.m. of wing 10 rendering actuator 51 operable only at very small angular velocity or at near zero r.p.m. of the rotor-wing 10.

Any appropriate known means may be substituted for the several conversion mechanisms hereinbefore detailed.

Engine power to rotate the wing systems may be transmitted from engine 15 by means of torque shaft 17 arranged to enter gear-box 16 which may contain any known suitable gear arrangement, such as for example, shown in FIG. 5. The power transmission means may also include any known clutch or free wheeling device commonly used in helicopters. Inner and outer drive shafts 12 and 18 respectively, extend upwardly from gear-box 16. The outer tubular shaft 18 is rigidly secured to and rotates with hub 19, which in turn is rigidly secured to and rotates with wing 10. Inner hollow drive shaft 12 is suitably journalled concentrically within and passes through shaft 18 into hub 19. Suitable bevel gears (not shown) appropriately arranged in said hub 19 establish a drive connection between said vertical inner shaft 12 and each of the oppositely laterally extending tubular drive shafts 78 (only one is shown in FIG. 3). Commonly driven tubular shafts 78 are suitably journalled within and pass through tubular spars 25 to the right-angle gear-boxes 39 which may contain any suitable bevel gear arrangement well known in the art, for example, such a gear-box is shown on page 147, FIG. 29, in the December 1952 issue of Machine Design.

Hollow driven shafts 70 extend vertically upwardly from gear boxes 39 and suitably secured to the upper ends thereof for rotation therewith are propeller-rotors, indicated generally at 20. Gear boxes 39 may include upper and lower fairings 37 and 38, respectively, and spinner or hub 36 to provide a streamlined configuration.

The rotor-wing system 10 is described hereinabove and shown to be mechanically driven by suitable shafting and gearing, however, if desired, wing 10 during rotor operation, may be power driven by reaction devices without experiencing the usual torque reaction of mechanically driven rotors, as such, the reaction devices may comprise any suitable known jet system, mounted as normal, at the opposite tips of the wing system. This suggests the possibility, that if the jet nozzles may be turned or rotated 180 degrees from their normal position, the reaction effect will provide a powerful brake, which alone, or conjointly with brake 50, may be used to quickly retard and stop the rotation of wing 10 for fixed wing operation.

Niclos Florine at the Antwerp Exposition in Belgium in 1930, successfully demonstrated a helicopter that had two mechanically driven main rotors, one forward, one aft, rotating in the same direction. Torque compensation was achieved by an equal and opposite angular or lateral tilt of the two rotors. This concept suggests that when the outboard rotors 20 operate in take off configuration, a differential mechanism may be provided in the present invention to oppositely tilt the outboard rotors by simply dividing shaft 34, operably connecting a differential mechanism to said divided shaft 34 so that the differential mechanism is interposed between motors 32. By suitable means the differential mechanism may be made responsive either to pilot control means or automatic means or both, whereby the outboard rotors 20 may be differentially tilted relative to each other in one sense to provide a reaction force capable of arresting the rotation of wing 10, or differentially tilted in an opposite sense, the outboard rotors 20 may provide a propulsive thrust capable or rotating the plurality of wing systems collectively about the central axis without the usual torque reaction effect of mechanically driven rotors.

Means, comprising protective devices, not shown, may be included in the invention to co-ordinate, disable, interlock, or interrelate the movements of the various conversion mechanisms, for example, it may be essential for obvious reasons, to provide safety interlock means to preclude an inadvertent or premature releasing of fixed wing 10 for rotor operation while the aircraft is operating an airplane configuration. Desirably, a second safety means may be included to disable conversion motors 32 when the aircraft operates in take off configuration. Means may be included also to render any or all of the various conversion mechanisms responsive to any or all the forces that act on a rotating body or a body in motion.

To maneuver the aircraft of the invention in normal forward flight when the aircraft operates in conventional airplane configuration or in compound helicopter configuration, all normal movement of the control column and rudder pedals (not shown) deflects the normal movable control surfaces such as the rudder 41, elevator 42 and ailerons 43 which results in movement of the aircraft about the appropriate axes. The airplane control surfaces may be operable in all flight regimes of the aircraft but will be effective only at relatively high forward speed to control the aircraft.

To maneuver the aircraft of the invention during takeoff landing, or slow forward flight, i.e., when the aircraft operates, in take off configuration, no control mechanism is provided, which is believed to be significantly important as embodied in the aircraft of the present invention, however, the effective, novel control means has general application as well to presently known helicopters and provides advantages hereinafter detailed.

The control means for each of the twin outboard rotors 20 is identical, only one will be described and one is shown diagrammatically in FIG. 4. Any suitable known mechanism may be substituted, if desired.

As seen in FIG. 4, a swash plate assembly, indicated generally at 60, which for convenience is shown mounted exteriorly above rotor hub 19, is arranged in a known manner, for both angular universal movement or tilt within predetermined limits, and axial movement whereby swash plate 60 may be bodily raised or lowered.

The swash-plate assembly 60 comprises a rotatable swash plate ring 61 mounted on a non-rotatable swash plate ring 62, anti-friction bearing 63 is interposed between the swash-plates 61 and 62. The inner non-rotatable swash plate 62 is mounted for universal limited tilt on ball 64 rigidly secured to the upper end of the control tube 65 which passes through and is axially shiftable for adjustment within tubular drive shaft 12, the lower end of control tube 65 is provided with integral laterally extending arm 58 which, in a known manner, is connected to a pilot actuated collective stick (not shown). The rotatable swash plate 61 is pivotally connected by link 66 to one arm of bell crank 67, the other arm thereof is pivotally connected to one end of push-pull link 68 which passes through drive shaft 78, the opposite outboard end of link 68 is pivotally connected to one arm of bell-crank 69, the other arm thereof being pivotally connected to a non rotating vertical push-pull link 71 which may be axially shiftable for adjustment within the bore of outboard rotor shaft 70. The upper end of vertical link 71 passes through shaft 70 into outboard rotor hub 36 and is operatively connected to a point intermediate the ends of a cross arm or link 72, in turn the opposite ends thereof are pivotally connected by ball joint means 74 to the pitch changing horns 73 of the rotor blades 24, this arrangement permits link 72 both to rotate with rotor 20 and to move bodily with non-rotating link 71 for vertical adjustment.

In any known manner, to permit blade pitch change, the blades 24 may be appropriately mounted to hub 36 for rotation about their spanwise axes. The blades may be further provided with any well known helicopter type flapping hinge which although deemed essential for helicopter mode of flight for both control purposes, and to neutralize the rolling moment due to unequal lift of the rotor halves during forward flight, however, it may be desirable to deactivate the blade flapping means when the rotors 20 are converted to propellers.

It will be seen from the foregoing description and by reference to FIG. 4, that vertical axial adjustment of control tube 65 in one direction raises the swash-plate assembly 60 attached thereto, while axial adjustment of tube 65 in the opposite direction lowers the swash-plate assembly, in turn, operatively associated parts 66, 67, 68, 69, 71, 72 and 73 are appropriately moved or adjusted to collectively increase or decrease the pitch of all the blades 24 of each rotor 20 an equal amount, thus, enabling the aircraft to ascend or descend.

To obtain any desired directional horizontal flight of the aircraft the swash-plate assembly 60 may be bodily tilted in any desired direction whereby the blades 24 of one rotor 20 are collectively increased in pitch an equal amount while the blades 24 of the diametrically opposite rotor 20 are collectively decreased in pitch an equal amount. Thus, although the total lift force of all the blades of the outboard rotors 20 remains constant, with application of collective differential pitch variation of the rotors 20 with respect to each other, an unbalanced lift force may be obtained across the collective rotor disc at any desired point in the orbit of the collectively rotating plurality of rotor systems.

It should be pointed out at this time that the differential collective control mechanism may be appropriately arranged to follow the gyroscopic laws of motion wherein a control input takes effect generally 90 degrees later in the rotation of a rotor.

Inclination of the swash-plate assembly 60 in any desired angular direction is achieved by a pair of vertical control rods 91 and 92 which are axially adjustable within the bore of and pass through control-tube 65. Integral with the upper ends of control rods 91 and 92 are radially extending arms 94 and 95, the outer ends thereof are suitably connected by ball joint means to one end of vertical links 96 (only one is seen in FIG. 4), the opposite end of links 96 are appropriately pivotally connected at points generally spaced 90 degrees on non-rotating swash plate 62. The lower extremities of rods 91 and 92 are provided with rigidly secured radial arms 98 and 99 which, in a known manner, may be operably connected to a pilot actuated pitch control member (not shown).

Operation of said pilot control member transmits vertical axial movement to the rods 91 and 92 so that by individual or conjoint adjustments of said rods the swash plate assembly 60 may be inclined, within predetermined limits, to any desired angular positions relative to hub 19 which is fixed with shaft 18. Angular tilting movement of the swash plate assembly 60 acts through the before mentioned operatively associated parts 66, 67, 68, 69, 71, 72, and 73 to effect a collective differential pitch adjustment of the outboard rotors 20, whereby the blades 24 of one rotor 20 are collectively increased while simultaneously the blades 24 of the opposite rotor 20 are correspondingly collectively decreased, thus, the total lift force of the outboard rotors 20 is unbalanced at any selected orbiting point thereof.

As will be remembered, rotor-wing 10 is rigidly fixed with shaft 18, its pitch is preadjusted at an optimum value for fixed-pitch rotor operation so that the twin outboard rotors 20 conjointly rotating with rotor-wing 10 with application of a differential collective pitch change as described above, act aerodynamically to incline the rotor wing fixed with shaft 18, together with the outboard rotors 20 to any selected angular position relative to space resulting in a horizontal flight thrust component for movement of the aircraft in any desired direction.

Several advantages are provided by the above detailed control means. For example, the flapping blade rotors 20 are carried on a rigid rotor-wing 10 relatively at a considerable distance from the central axis of rotation (center of gravity) this arrangement, following the laws of the spinning gyroscope, offers a considerable resistance to forces tending to change the direction of the axis of spin of the rotor whereby the stability of the aircraft about its axes of pitch and roll is relatively improved. In addition, with the flight control moments occurring at a distance substantially removed from the axis of rotation a greater leverage force produces a powerful control moment, conversely, the control input requirement is decreased. Another advantage of the spaced apart control rotors 20 carried at the opposite tips of the rigid wing-rotor 10 is that the center of gravity range is thereby substantially widened. As known, a serious drawback of prior helicopter with small offset flapping hinges is their very narrow center of gravity.

Although the invention is disclosed as having a single rotor-wing 10 carrying a pair of twin outboard rotors 20, obviously, if desired, a single dynamically balanced outboard rotor may be used or two rotor wings may be mounted in tandem having four outboard rotors arranged in double tandem. Other obvious changes within the scope of the invention may occur to those skilled in the art.

What is claimed is:

1. In an aricraft, the combination with a fuselage with a longitudinal axis, a first vertical-lift blade thereon having a longitudinal axis and being turnable about a substantially vertical first axis, and a first power drive for said blade controllable from said fuselage, of second blades having rotary axes and being pivoted on said first blade for tilting movement about said longitudinal axis thereof and on opposite sides of said first axis with the rotary axes of said second blades extending substantially normal to said longitudinal axis of said first blade; means operable from said fuselage to tilt said second blades on said first blade into positions in which the rotary axes of said second blades are substantially vertical and substantially horizontal for action of the latter as vertical-lift and forward-propulsion blades, respectively; and power drives independent of said first power drive for operating said second blades in either of said positions.

2. The combination in an aircraft as set forth in claim 1, which further comprises means for releasably locking said first blade to said fuselage in an angular position in which its longitudinal axis extends normal to said longitudinal fuselage axis.

3. The combination in an aircraft as set forth in claim 1, in which said second blades extend beyond the span of said first blade and thereby increase the available overall blade span for vertical lift beyond that of said first blade.

4. The combination in an aircraft as set forth in claim 1, which further provides means for varying the pitch of said second blades in either of said positions.

References Cited by the Examiner

UNITED STATES PATENTS

| 1,274,886 | 8/1918 | Jacobson | 170—135.21 |
| 2,511,025 | 6/1950 | Tucker et al. | 244—7 |
| 2,589,826 | 3/1952 | Larsen | 170—135.21 X |

FOREIGN PATENTS

| 296,754 | 5/1932 | Italy. |
| 948,561 | 1/1949 | France. |

MILTON BUCHLER, *Primary Examiner.*

FERGUS S. MIDDLETON, *Examiner.*